Figure 1:
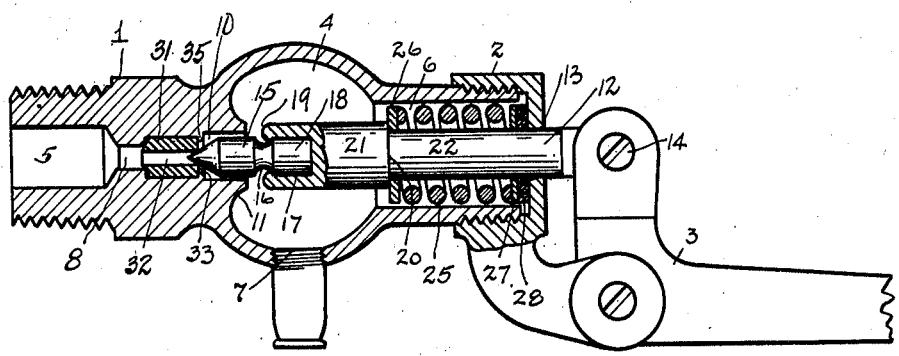

May 11, 1926.

J. R. BROWN

VALVE SEAT

Filed August 4, 1924

1,584,007

INVENTOR.
John Rowland Brown
BY
Fay Oberlin & Fay
ATTORNEYS

Patented May 11, 1926.

1,584,007

UNITED STATES PATENT OFFICE.

JOHN ROWLAND BROWN, OF CLEVELAND, OHIO, ASSIGNOR TO THE RELIANCE GAUGE COLUMN COMPANY, OF CLEVELAND, OHIO, A CORPORATION OF OHIO.

VALVE SEAT.

Application filed August 4, 1924. Serial No. 729,917.

This invention relates to valve seats. More particularly it comprises a valve seat formed of metal of greater hardness than the valve casing and so shaped and seated within the valve casing as to provide a fluid-tight joint without the use of packing or additional parts.

In a recently issued patent covering an improved gauge cock, No. 1,496,145, granted June 3, 1924, the applicant disclosed an improved valve pin preferably formed of hard, non-rusting metal such as hot rolled Monel metal. Said valve pin made direct contact with a valve seat formed in the body of the valve casing. The present invention provides for a seat of hard, non-rusting metal to be inserted in the body of the valve casing and to co-operate with the valve pin which may or may not be formed of the same metal, as desired.

With a valve seat formed in the body of the casing, the necessity of at times renewing the seat arises, and inasmuch as the seat is somewhat difficult of access, the provision of an accurately ground and satisfactory seat is a matter of some difficulty. With the present invention the seat is provided of wear resisting material and renewal thereof is unnecessary during the life of the apparatus. If for any reason it should become necessary to replace the seat, the same may be bodily removed and a new seat inserted in place thereof without the necessity of performing any accurate machining upon the valve casing at a somewhat inaccessible point.

It is obvious that where a valve pin of similar metal is used, the renewal of the valve parts may be unnecessary in view of the wear resisting qualities of each of the contact elements. However, it should be noted that ready access may be had to the valve pin and its replacement or adjustment is possible with a minimum amount of difficulty, inasmuch as the entire valve stem and pin holding socket may be easily removed from the valve casing, and any necessary replacement for repairs accomplished with ease.

The object of my invention, as above indicated, is to provide an improved valve seat, particularly when adapted to be inserted in gauge cocks of the character described. Other objects of the invention will appear in the course of the following description. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 2:
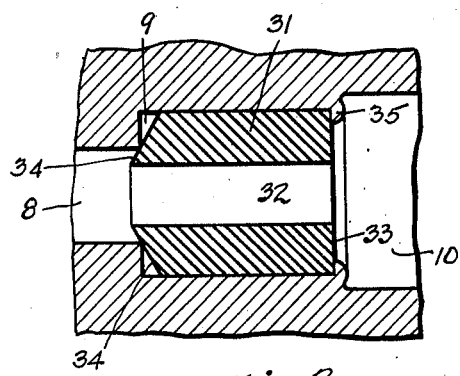
Figure 3:
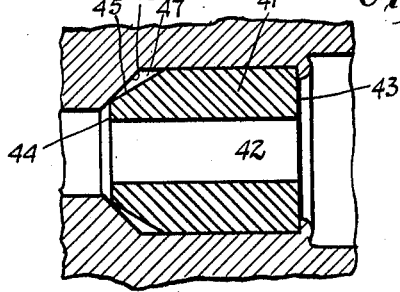

Fig. 1 is a side elevation, partially in section, showing the improved valve seat as applied to a gauge cock; Fig. 2 is an enlarged detail view showing one method of applying the valve seat to a valve casing; and Fig. 3 is a view similar to Fig. 2 showing differently related contact surfaces.

The drawing discloses a type of gauge cock embodying improved features more fully set forth in my patent above referred to. The apparatus comprises a body portion 1, having upon one end a cap section 2 secured by screw-threaded engagement therewith. The cap is provided with an outwardly extending support for a bell crank lever 3 which is pivotally mounted thereon.

Centrally of the body portion a valve chamber 4 is provided, said chamber having an inlet passageway 5 at one side and at the opposite side is provided with a housing 6 for the valve spring. At the lower portion of the valve chamber an outlet passageway 7 of the usual character is provided. The inlet passageway 5, as it extends toward the valve chamber, is formed of constricted diameter 8 and at its inner end is provided with double countersunk recesses 9, 10, in axial alignment therewith. The innermost of these recesses 10 is preferably of larger diameter than the recess 9 immediately adjacent to the constricted portion 8 of the inlet passageway. The last-named recess is intended to receive the valve seat, as will be presently described.

The wall of the valve chamber has an inwardly extending contour 11 surrounding the inner countersunk portion 10, heretofore described. This countersunk portion is of somewhat larger diameter than the diameter of the valve pin, the lower end of which it is adapted to surround. The space between the valve pin and the walls of the countersunk recess 10 is sufficient to permit slight lateral displacement of the pin, but not enough to allow the point thereof to be moved out of register with the central passageway through the body of the valve seat hereinafter to be described.

The valve stem 12 extends along the longitudinal axis of the body portion of the casing from the valve seat through a central aperture 13 in the cap, and is provided with a pivot pin 14 at its outer end for connection with one end of the bell crank lever heretofore mentioned. The inner end of the valve stem may be provided with a valve pin 15, preferably of a hard, non-rusting metal such as hot rolled Monel metal. When such pin is used the same is preferably formed with an annular depression 16 near its base, and the body of the valve stem is provided with a recessed portion 17 into which the base 18 of the valve pin is inserted. The metal at the rim 19 at the recess of the body portion is then spun into the annular depression of the valve pin and the parts are thus held in rigid permanent relation.

Centrally of its length the valve stem is provided with an annular shoulder 20, preferably by making its inner portion 21 of larger diameter than the outer portion 22, as is clearly shown in the drawing.

The housing for the valve spring, as is clearly shown in the drawing, is an extension of the main valve chamber and is in direct communication therewith. In many forms of gauge cocks it is usual to provide a wall between the valve spring housing and the valve chamber, the wall being provided with an aperture forming a guide for the valve stem. Such wall is unnecessary with a construction of the type described, in view of the guiding elements provided at the forward end of the valve casing and adjacent the valve seat.

Surrounding the valve stem within the valve stem housing, is the valve spring 25, at its inner end abutting a washer 26 seated against the shoulder on the valve stem before mentioned and at its outer end engaging a washer 27, beneath which is placed a packing ring 28 which serves to make a fluid-tight joint with the cap.

The valve seat 31, as is more clearly shown in Fig. 2, comprises a cylindrical body portion having an axial bore 32, preferably of smaller diameter than that of the constricted portion 8 of the inlet passageway. The outer end of the valve seat is provided with a flat face 33 and the inner end thereof is provided with a face 34 presenting the surface of a truncated cone, said face standing at substantially an angle of 30 degrees to the opposite end of said valve seat. It will be noted that the conical portion of the valve seat is adapted to bear against the sharp edge provided in the body of the valve casing at the point where the constricted inner passageway merges with the countersunk recess 9. The hard material of the valve seat, when firmly pressed against the edge thus provided in the casing, serves to form a fluid-tight joint therewith. The seat is permanently held against the edge referred to by any preferred means. As shown in the drawing, the metal of the casing adjacent the outer edge of the countersunk recess 9 is spun inwardly so as to form an annular clamping ring 35 bearing against the face of the valve seat. Other methods of securing the valve seat may be employed, but preferably such means should press against the face of the valve seat body adjacent its outer edge.

It will be noted that the recess 9 is of a size to receive the valve seat body, but the fitting of the said valve seat body within said recess may be accomplished without the usual precautions of carefully reaming out the hole and accurately fitting the seat therein, because the contact of the valve seat body with the edge of the housing provided by the recess 9 is a line contact instead of a contact with a flat seat. A fluid-tight joint is therefore provided between the valve casing and the valve seat body without the use of a multiplicity of parts or expensive machining.

It is obvious that the valve seat body may be removed whenever desired by forcing the same outwardly and displacing the metal spun over its edge.

In the form of construction illustrated in Fig. 3, the valve seat 41 is a cylindrical body having an axial bore 42 and has flat outer and inner faces 43, 44. A conical face 45 is provided adjacent the lower portion and the meeting edge of the surfaces of these faces 44 and 45 provides a sharp angle to contact with a beveled surface 46 formed at the base of the countersunk recess 47. The surfaces 45 and 46 are positioned angularly with respect to each other and a liquid tight line contact is thus provided between the valve seat and the casing. The means of holding the valve seat in the countersunk recess has been described above.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination of a valve casing having a passageway, a countersunk recess adjacent said passageway, a valve seat fitting within said recess, adjacent faces of said valve seat and casing being angularly related to bring a plane surface of one of said parts against the meeting edge of adjacent faces on the other of said parts to form a line contact, and a turned over edge on said casing, adjacent the outer end of the countersunk recess, bearing against said valve seat and holding the same in firm contact with the casing.

2. In an apparatus of the character described, the combination of a body having a chamber with inlet and outlet openings, a centrally apertured cylindrical valve seat housed in a recess adjacent one of said openings, a reciprocable valve stem provided with a valve pin adapted to co-operate with said seat, said chamber including a countersunk recess aligned with the seat opening of such diameter that the valve pin cannot be displaced to non-seating position to one side of said seat opening, and a conical face on one end of said valve seat adapted to form a fluid-tight joint at the meeting point with the base of said first-mentioned recess.

3. A valve seat of hard non-rusting metal adapted to be placed within a valve casing in alignment with a reciprocating valve pin, said casing being provided with a countersunk recess for receiving said seat, a bore of somewhat larger diameter than the passageway through said valve seat communicating with one end of said recess, a beveled face on the inner end of said valve seat adapted to contact with the edge at the base of said countersunk recess, and means for holding said valve seat within said recess.

4. In combination, a valve casing, a valve seat comprising a cylindrical body portion formed of metal of hard non-rusting composition, an axial bore through said body to provide a fluid passageway, a flat outer face on said body and a beveled inner face, the meeting point of the flat outer face with said axial bore providing a valve seat for a reciprocating valve pin, and the beveled inner face of said body being adapted to bear against an annular shoulder formed in the valve casing to provide a fluid-tight joint between said valve seat and said valve casing and means for holding said valve seat in the valve casing, said means comprising metal spun in from the casing.

Signed by me, this 24th day of July, 1924.

JOHN ROWLAND BROWN.